United States Patent
Kidder et al.

(10) Patent No.: US 9,759,427 B2
(45) Date of Patent: Sep. 12, 2017

(54) INTERFACE ASSEMBLY FOR A COMBUSTOR

(71) Applicant: General Electric Company, Schenectady, NY (US)

(72) Inventors: Kyle Lee Kidder, Greenville, SC (US); Donald Timothy Lemon, Greenville, SC (US); Stephen Gerard Pope, Roebuck, SC (US)

(73) Assignee: General Electric Company, Schenectady, NY (US)

( * ) Notice: Subject to any disclaimer, the term of this patent is extended or adjusted under 35 U.S.C. 154(b) by 612 days.

(21) Appl. No.: 14/069,812

(22) Filed: Nov. 1, 2013

(65) Prior Publication Data

US 2015/0121880 A1    May 7, 2015

(51) Int. Cl.
| | | |
|---|---|---|
| *F01D 9/02* | (2006.01) | |
| *F02C 7/28* | (2006.01) | |
| *F23R 3/60* | (2006.01) | |
| *F02C 3/04* | (2006.01) | |

(52) U.S. Cl.
CPC ............ *F23R 3/60* (2013.01); *F01D 9/023* (2013.01); *F02C 3/04* (2013.01); *F02C 7/28* (2013.01); *F05D 2240/35* (2013.01); *F05D 2240/55* (2013.01); *F05D 2240/56* (2013.01); *F05D 2240/57* (2013.01); *F05D 2240/58* (2013.01); *F23R 2900/00012* (2013.01)

(58) Field of Classification Search
CPC ........ F01D 9/023; F02C 7/28; F05D 2240/55; F05D 2240/56; F05D 2240/57; F05D 2240/58
See application file for complete search history.

(56) References Cited

U.S. PATENT DOCUMENTS

| | | | | | |
|---|---|---|---|---|---|
| 2,457,157 | A | * | 12/1948 | King, Jr. ................... | F23R 3/26 431/351 |
| 4,067,534 | A | * | 1/1978 | Frey ....................... | B29C 65/02 285/293.1 |
| 4,353,462 | A | * | 10/1982 | Polaneczky .......... | G11B 23/027 206/1.5 |
| 4,413,477 | A | * | 11/1983 | Dean ....................... | F23R 3/002 60/757 |
| 5,289,677 | A | * | 3/1994 | Jarrell ...................... | F23R 3/60 60/752 |
| 5,343,694 | A | * | 9/1994 | Toborg .................... | F01D 9/042 415/209.2 |
| 5,577,379 | A | * | 11/1996 | Johnson .................. | F23R 3/283 60/740 |
| 6,675,584 | B1 | * | 1/2004 | Hollis ..................... | F01D 9/023 60/796 |
| 7,416,362 | B2 | * | 8/2008 | North .................... | F16B 5/0241 267/150 |
| 7,926,283 | B2 | * | 4/2011 | Byrne ....................... | F23R 3/06 60/752 |
| 9,316,119 | B2 | * | 4/2016 | Sonokawa ............ | F01D 25/183 |

(Continued)

*Primary Examiner* — Pascal M Bui Pho
*Assistant Examiner* — Eric Linderman
(74) *Attorney, Agent, or Firm* — Ernest G. Cusick; Frank A. Landgraff

(57) ABSTRACT

An interface assembly for a combustor includes an interface housing having a channel defined by a forward wall and at least one aft wall segment, the aft wall segment operatively coupled to an aft flange of a flow sleeve. Also included is a piston ring fittingly disposed in the channel.

18 Claims, 4 Drawing Sheets

(56) References Cited

U.S. PATENT DOCUMENTS

| | | | | |
|---|---|---|---|---|
| 9,327,368 B2* | 5/2016 | Hagan | | F02C 7/28 |
| 9,624,833 B2* | 4/2017 | Kraus | | F02C 7/28 |
| 2003/0066292 A1* | 4/2003 | Mack | | F01D 9/023 |
| | | | | 60/752 |
| 2004/0017045 A1* | 1/2004 | Cross | | F02K 1/004 |
| | | | | 277/377 |
| 2004/0036230 A1* | 2/2004 | Matsuda | | F01D 9/023 |
| | | | | 277/632 |
| 2004/0154303 A1* | 8/2004 | Mitchell | | F01D 11/005 |
| | | | | 60/772 |
| 2004/0250548 A1* | 12/2004 | Howell | | F23R 3/002 |
| | | | | 60/796 |
| 2005/0063816 A1* | 3/2005 | Jorgensen | | F01D 11/003 |
| | | | | 415/110 |
| 2005/0217096 A1* | 10/2005 | Chan | | B25B 27/0028 |
| | | | | 29/235 |
| 2005/0260436 A1* | 11/2005 | Einberger | | C23C 4/06 |
| | | | | 428/655 |
| 2006/0032236 A1* | 2/2006 | Aumont | | F01D 9/023 |
| | | | | 60/796 |
| 2006/0242965 A1* | 11/2006 | Shi | | F23R 3/60 |
| | | | | 60/796 |
| 2008/0048398 A1* | 2/2008 | Baird | | F01D 11/003 |
| | | | | 277/355 |
| 2008/0080970 A1* | 4/2008 | Cooke | | F01D 9/042 |
| | | | | 415/173.3 |
| 2008/0112797 A1* | 5/2008 | Seitzer | | F01D 11/24 |
| | | | | 415/116 |
| 2008/0179837 A1* | 7/2008 | Ryan | | F01D 9/023 |
| | | | | 277/591 |
| 2009/0075115 A1* | 3/2009 | Tryon | | C23C 10/02 |
| | | | | 428/656 |
| 2009/0120093 A1* | 5/2009 | Johnson | | F01D 9/023 |
| | | | | 60/752 |
| 2009/0133403 A1* | 5/2009 | Som | | F01D 9/023 |
| | | | | 60/752 |
| 2009/0288422 A1* | 11/2009 | Cernay | | F23R 3/60 |
| | | | | 60/800 |
| 2010/0011780 A1* | 1/2010 | Varney | | F01D 25/243 |
| | | | | 60/796 |
| 2010/0071376 A1* | 3/2010 | Wiebe | | F23R 3/002 |
| | | | | 60/740 |
| 2010/0089068 A1* | 4/2010 | Ellis | | F23R 3/60 |
| | | | | 60/796 |
| 2010/0111682 A1* | 5/2010 | Scoggins | | F01D 9/041 |
| | | | | 415/191 |
| 2010/0192587 A1* | 8/2010 | Hessler | | F23R 3/16 |
| | | | | 60/752 |
| 2010/0201074 A1* | 8/2010 | Haynes | | F16J 15/441 |
| | | | | 277/361 |
| 2010/0300116 A1* | 12/2010 | Kaleeswaran | | F01D 9/023 |
| | | | | 60/800 |
| 2010/0307166 A1* | 12/2010 | Woodcock | | F01D 9/023 |
| | | | | 60/796 |
| 2011/0067402 A1* | 3/2011 | Wiebe | | F23R 3/08 |
| | | | | 60/740 |
| 2011/0120133 A1* | 5/2011 | Rudrapatna | | F23R 3/002 |
| | | | | 60/752 |
| 2011/0120135 A1* | 5/2011 | Johnson | | F01D 9/023 |
| | | | | 60/772 |
| 2011/0123329 A1* | 5/2011 | Takeuchi | | F01D 11/001 |
| | | | | 415/230 |
| 2011/0140370 A1* | 6/2011 | Sutcu | | F01D 9/023 |
| | | | | 277/603 |
| 2011/0173984 A1* | 7/2011 | Valeev | | F01D 9/023 |
| | | | | 60/752 |
| 2011/0179798 A1* | 7/2011 | Pieussergues | | F01D 9/023 |
| | | | | 60/752 |
| 2011/0252805 A1* | 10/2011 | Berry | | F23R 3/002 |
| | | | | 60/772 |
| 2012/0023968 A1* | 2/2012 | Shteyman | | F01D 25/243 |
| | | | | 60/796 |
| 2012/0112415 A1* | 5/2012 | Benjamin | | F01D 11/003 |
| | | | | 277/303 |
| 2012/0186269 A1* | 7/2012 | Cihlar | | F01D 9/023 |
| | | | | 60/796 |
| 2012/0189429 A1* | 7/2012 | Witlicki | | F01D 25/164 |
| | | | | 415/119 |
| 2012/0192571 A1* | 8/2012 | McCormick | | F23R 3/60 |
| | | | | 60/796 |
| 2012/0210729 A1* | 8/2012 | Cihlar | | F01D 9/023 |
| | | | | 60/796 |
| 2012/0304657 A1* | 12/2012 | Melton | | F23R 3/60 |
| | | | | 60/752 |
| 2012/0306166 A1* | 12/2012 | Melton | | F01D 9/023 |
| | | | | 277/637 |
| 2013/0004306 A1* | 1/2013 | Albers | | F01D 25/246 |
| | | | | 415/200 |
| 2013/0028717 A1* | 1/2013 | Helvaci | | F01D 11/005 |
| | | | | 415/182.1 |
| 2013/0042631 A1* | 2/2013 | Jadhav | | F16J 15/061 |
| | | | | 60/800 |
| 2013/0069313 A1* | 3/2013 | Sonokawa | | F01D 11/003 |
| | | | | 277/300 |
| 2013/0086920 A1* | 4/2013 | Chen | | F23R 3/005 |
| | | | | 60/782 |
| 2013/0174558 A1* | 7/2013 | Stryapunin | | F23R 3/286 |
| | | | | 60/734 |
| 2013/0192260 A1* | 8/2013 | Mayer | | F01D 11/003 |
| | | | | 60/805 |
| 2013/0291544 A1* | 11/2013 | Eastwood | | F23R 3/50 |
| | | | | 60/734 |
| 2013/0319005 A1* | 12/2013 | Aiello | | F01D 11/02 |
| | | | | 60/805 |
| 2014/0020389 A1* | 1/2014 | Melton | | F23R 3/10 |
| | | | | 60/722 |
| 2014/0054862 A1* | 2/2014 | Davis | | F01D 11/025 |
| | | | | 277/370 |
| 2014/0091535 A1* | 4/2014 | Cusack | | F16J 15/3284 |
| | | | | 277/641 |
| 2014/0116065 A1* | 5/2014 | Sandelis | | F01D 5/186 |
| | | | | 60/805 |
| 2014/0208756 A1* | 7/2014 | Sullivan | | F23R 3/04 |
| | | | | 60/725 |
| 2014/0341722 A1* | 11/2014 | Belmonte | | F01D 11/122 |
| | | | | 415/173.4 |
| 2014/0345249 A1* | 11/2014 | Fukuda | | F02C 7/10 |
| | | | | 60/39.511 |
| 2015/0101345 A1* | 4/2015 | Green | | F01D 9/02 |
| | | | | 60/799 |
| 2015/0204447 A1* | 7/2015 | Kloepfer | | F01D 9/041 |
| | | | | 277/306 |
| 2015/0226132 A1* | 8/2015 | Roy Thill | | F16J 15/0887 |
| | | | | 415/183 |
| 2015/0240724 A1* | 8/2015 | Low | | F01D 9/023 |
| | | | | 60/722 |
| 2016/0040886 A1* | 2/2016 | Danburg | | F01D 9/023 |
| | | | | 60/752 |
| 2016/0130963 A1* | 5/2016 | Wilson | | F01D 11/001 |
| | | | | 60/805 |
| 2016/0230673 A1* | 8/2016 | Milligan | | F01D 25/246 |
| 2016/0356182 A1* | 12/2016 | Becker | | F01D 25/285 |

* cited by examiner

INTERFACE ASSEMBLY FOR A COMBUSTOR

BACKGROUND OF THE INVENTION

The subject matter disclosed herein relates to gas turbine engines, and more particularly to an interface assembly for a combustor arrangement.

Gas turbine engines include a combustor arrangement that includes a combustor liner for defining a combustor chamber that is located adjacent a downstream transition piece, which routes a hot gas to a turbine section of the gas turbine engine. A flow sleeve often surrounds the combustor liner, with the flow sleeve engaging the transition piece at an aft end of the flow sleeve. At the interface between the flow sleeve and the transition piece is a structure, such as a piston ring, used to control a pressure drop in the combustor arrangement. The piston rings accumulate substantial wear during a typical combustion cycle. Once worn out, replacing the interface between the flow sleeve and the transition piece is cumbersome, time-consuming and labor-intensive. Undesirably, the entire flow sleeve must be removed from the combustor arrangement and shipped to a manufacturer for replacement.

BRIEF DESCRIPTION OF THE INVENTION

According to one aspect of the invention, an interface assembly for a combustor includes an interface housing having a channel defined by a forward wall and at least one aft wall segment, the aft wall segment operatively coupled to an aft flange of a flow sleeve. Also included is a piston ring fittingly disposed in the channel.

According to another aspect of the invention, a combustor arrangement includes a combustor liner and a flow sleeve disposed radially outwardly of the combustor liner. Also included is a transition piece disposed adjacent to an aft flange of the flow sleeve. Further included is an interface assembly disposed between the flow sleeve and the transition piece. The interface assembly includes a forward wall having an outer face and an inner face. The interface assembly also includes a plurality of circumferentially spaced aft wall segments connected to the forward wall with a base wall, the base wall, the forward wall and the plurality of circumferentially spaced aft wall segments integrally formed and defining a channel, the interface assembly operatively coupled to the aft flange of the flow sleeve proximate an intersection of the plurality of circumferentially spaced aft wall segments and the base wall. The interface assembly further includes a piston ring fittingly disposed in the channel. The interface assembly yet further includes a resilient member disposed between an outer surface of the base wall and an inner surface of the aft face of the flow sleeve.

According to yet another aspect of the invention, a gas turbine engine includes a compressor, a turbine and a combustor arrangement having a flow sleeve and a transition piece disposed proximate an aft flange of the flow sleeve. Also included is an interface assembly disposed between the flow sleeve and the transition piece. The interface assembly includes an interface housing having a channel defined by a forward wall and a plurality of circumferentially spaced aft wall segments, the interface housing operatively coupled to the aft flange of the flow sleeve. The interface assembly also includes a piston ring fittingly disposed in the channel.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
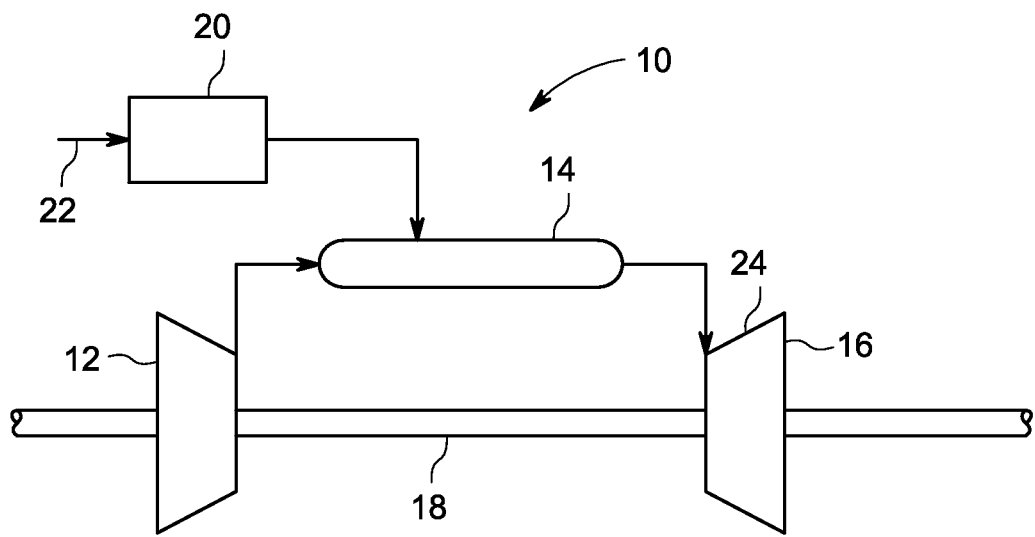
FIG. 1 is a schematic illustration of a gas turbine engine.

Referring to FIG. 1, a turbine system, such as a gas turbine engine, for example, is schematically illustrated with reference numeral 10. The gas turbine engine 10 includes a compressor section 12, a combustor section 14, a turbine section 16, a rotor 18 and a fuel nozzle 20. It is to be appreciated that one embodiment of the gas turbine engine 10 may include a plurality of compressors 12, combustors 14, turbines 16, rotors 18 and fuel nozzles 20. The compressor section 12 and the turbine section 16 are coupled by the rotor 18.

The combustor section 14 uses a combustible liquid and/or gas fuel, such as natural gas or a hydrogen rich synthetic gas, to run the gas turbine engine 10. For example, fuel nozzles 20 are in fluid communication with an air supply and a fuel supply 22. The fuel nozzles 20 create an air-fuel mixture, and discharge the air-fuel mixture into the combustor section 14, thereby causing a combustion that creates a hot pressurized exhaust gas. The combustor section 14 directs the hot pressurized gas through a transition piece into a turbine nozzle (or "stage one nozzle"), and other stages of buckets and nozzles causing rotation of turbine blades within an outer casing 24 of the turbine section 16.

Figure 2:
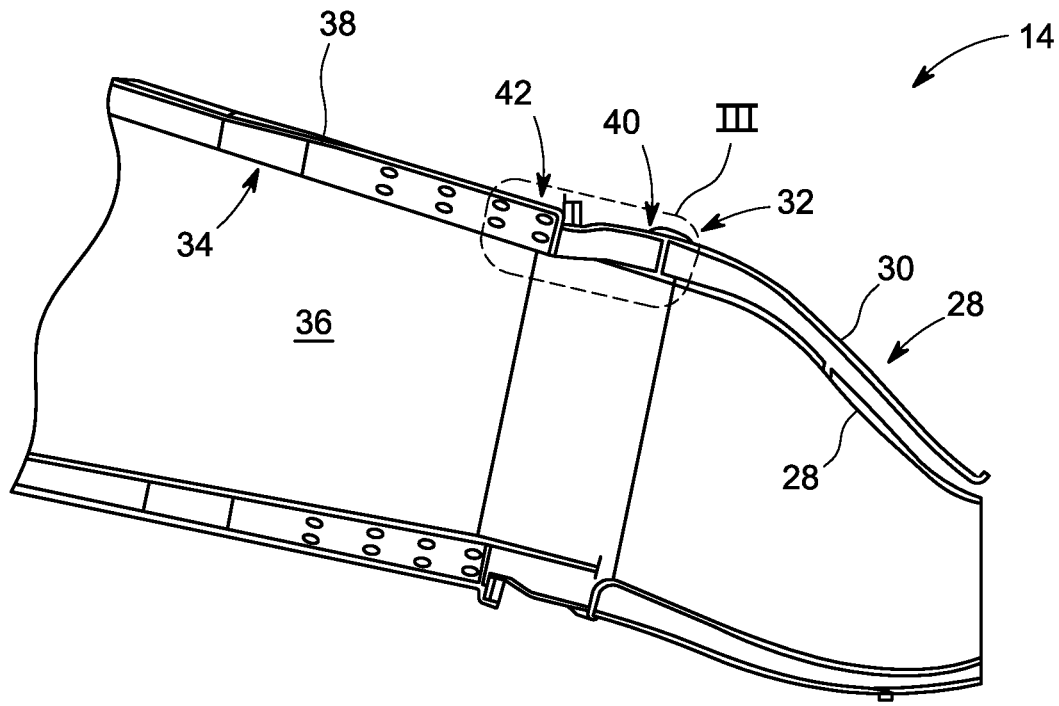
FIG. 2 is a partial, schematic illustration of a combustor arrangement of the gas turbine engine.
Figure 3:
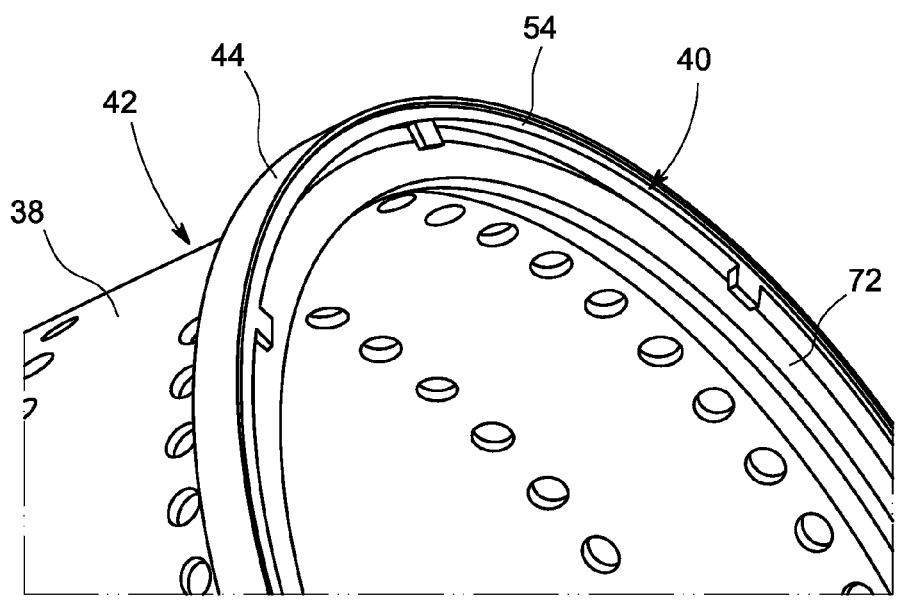
FIG. 3 is an enlarged, perspective view of section III of FIG. 2, illustrating an interface assembly operatively coupled to an aft end of a flow sleeve of the combustor arrangement.
Figure 4:
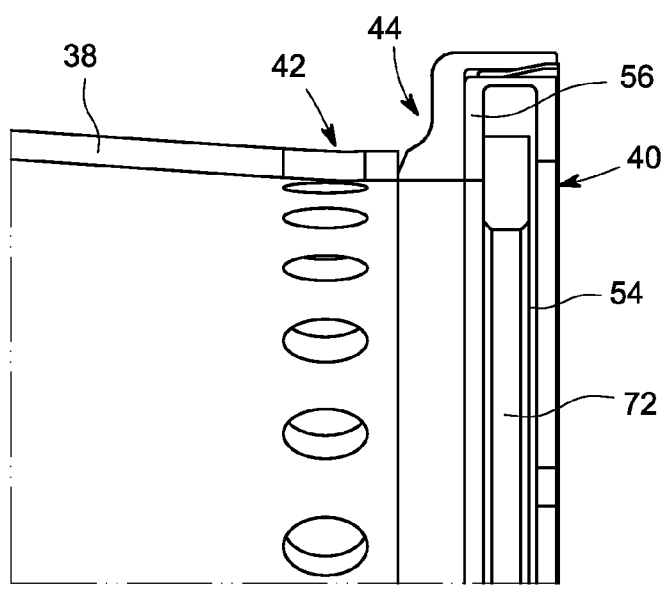
FIG. 4 is a side, elevational view of the interface assembly operatively coupled to the aft end of the flow sleeve.
Figure 5:
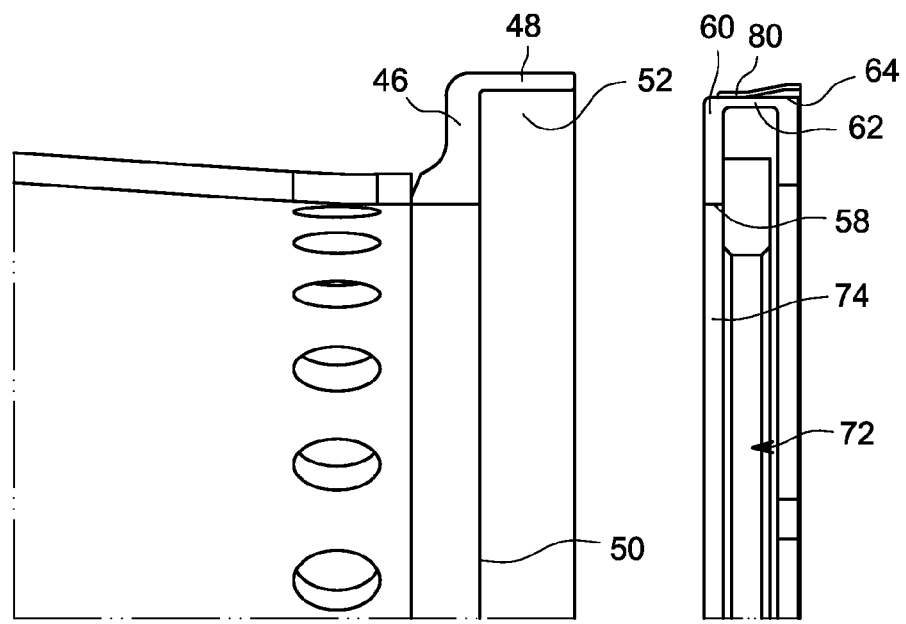
FIG. 5 is a side, elevational view of the interface assembly prior to coupling with the flow sleeve.
Figure 6:
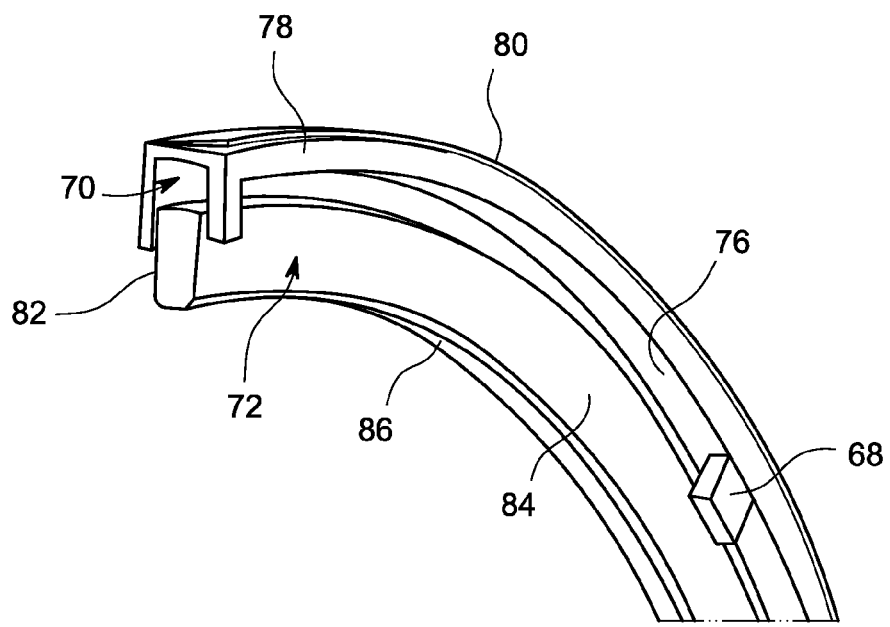
FIG. 6 is a perspective view of a portion of the interface assembly.

Referring to FIG. 2, a partial schematic illustrates the combustor section 14 of the gas turbine engine 10 in greater detail. The combustor section 14 includes a transition piece 28 at least partially surrounded by an impingement sleeve 30 disposed radially outwardly of the transition piece 28. Upstream thereof, proximate a forward end 32 of the impingement sleeve 30 is a combustor liner 34 defining a combustor chamber 36. The combustor liner 34 is at least partially surrounded by a flow sleeve 38 disposed radially outwardly of the combustor liner 34. An interface assembly 40, which is discussed in detail below, is located at the junction between the forward end 32 of the impingement sleeve 30 and an aft end 42 of the flow sleeve 38. It is contemplated that certain embodiments of the combustor section 14 do not include the impingement sleeve 30 discussed above, such that a single liner of the transition piece 28 is included and is coupled to the aft end 42 of the flow sleeve 38 and/or the combustor liner 34. Irrespective of the precise embodiment, the interface assembly 40 is located at the junction between the overall transition piece arrangement and the aft end 42 of the flow sleeve 38.

Referring to FIGS. 3-6, the aft end 42 of the flow sleeve 38 and the interface assembly 40 are illustrated in greater detail. As shown, the aft end 42 of the flow sleeve 38 includes an aft flange 44 having a first segment 46 and a second segment 48. The first segment 46 extends in a substantially radial direction, relative to a central axis of rotation of the gas turbine engine 10, and the second segment 48 is oriented substantially perpendicular to the first segment 46, such that the aft flange 44 is substantially L-shaped. The first segment 46 includes an aft face 50 and the second segment 48 includes an inner surface 52 that are each configured to interface with the interface assembly 40.

The interface assembly 40 is configured to seal a region between the flow sleeve 38 and the impingement sleeve 30 and/or the transition piece 28. Additionally, the interface assembly 40 controls a pressure drop in the combustor chamber 36. The interface assembly 40 includes an interface housing 54 that extends in a circumferential manner to form a ring. The ring formed may be a single, continuous structure or a plurality of segments that combine to form the ring. A forward wall 56 extends from a first end 58 to a second end 60 and is integrally formed with a base wall 62 that extends from the second end 60 of the forward wall 56 to a third end 64. Extending radially inwardly from the base wall 62, and more particularly the third end 64, is at least one, but typically a plurality of aft wall segments 68 that form a channel 70 with the base wall 62 and the forward wall 56. The interface housing 54 comprises a substantially U-shaped structure in regions where the plurality of aft wall segments 68 are located, while the remainder of the interface housing 54 comprises a substantially L-shaped structure defined by the forward wall 56 and the base wall 62.

The interface housing 54 is configured to receive and fittingly retain a piston ring 72 within the channel 70 defined by the forward wall 56, the base wall 62 and the plurality of aft wall segments 68. The piston ring 72 is sized to be inserted into tight engagement with the channel 70, and disposed therein. More specifically, the piston ring 72 is in direct contact with an inner face 74 of the forward wall 56. Additionally, a piston ring inner surface 86 is in direct contact with the forward end 32 of the impingement sleeve 30, or with the forward end of the transition piece 28 for embodiments lacking an impingement sleeve. Retaining of the piston ring 72 in the channel 70 is at least partially achieved with the plurality of aft wall segments 68 that are also in contact with the piston ring 72. Additionally, an anti-rotation component, such as a pin-slot arrangement, may be included to retain the piston ring 72 within the channel 70 and to reduce or eliminate circumferential movement of the piston ring 72 therein.

Operatively coupled to an outer surface 78 of the base wall 62 is a resilient member 80, such as a spring leaf seal, for example. The resilient member 80 may be integrally formed with the base wall 62 in one embodiment. The resilient member 80 is disposed between the outer surface 78 of the base wall 62 and an inner surface 52 of the second segment 48 of the aft flange 44 and is configured to radially bias the interface housing 54, and therefore the piston ring 72, in a radially inward direction.

To prolong the life of the interface assembly 40, a wear coating is disposed on at least one surface of the piston ring 72 and the interface housing 54. Any suitable wear coating may be employed. In one embodiment, the wear resistant coating comprises a wear resistant material, such as a cobalt chromium alloy, for example. One such material comprises Stellite® 6. The wear coating may be disposed on a piston ring forward face 82, a piston ring aft face 84, the piston ring inner face 86, the inner face 74 of the forward wall 56, and/or the aft face 50.

The interface assembly 40 comprises a pre-assembled assembly that is able to replace interface assemblies that have worn out due to combustion operation. Advantageously, a user is not required to disassemble bulkier components, such as the flow sleeve 38, for example, for shipment to a manufacturer during replacement efforts. The interface assembly 40 is operatively coupled to the flow sleeve 38 and may easily be disassembled therefrom. Operative coupling of the interface assembly 40 to the flow sleeve 38 may be achieved in a number of contemplated manners. In one embodiment, the interface assembly 40 is welded to a location proximate the aft end of the second segment 48 of the aft flange 44. In another embodiment, the interface assembly 40 is coupled to the aft flange 44 with mechanical fasteners.

Figure 7:
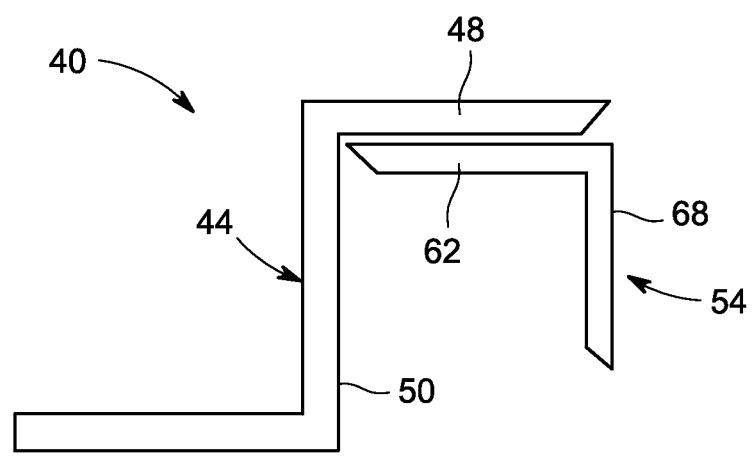
FIG. 7 is a schematic illustration of a portion of the interface assembly according to another embodiment.

Referring to FIG. 7, an alternative embodiment of the interface assembly 40 is partially illustrated. In the illustrated embodiment, the interface housing 54 is a substantially L-shaped structure that includes the base wall 62 and the plurality of aft wall segments 68, with only one aft wall segment shown. As with the embodiments described above, the interface housing 54 is operatively coupled, such as by being welded, to a location proximate the aft end of the second segment 48 of the aft flange 44. In such an embodiment, a wear coating consistent with the materials discussed above may be disposed on the aft face 50 of the aft flange 44.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A combustor comprising:
a flow sleeve comprising an aft flange;
a transition piece disposed adjacent to the aft flange of the flow sleeve; and
an interface assembly disposed axially between the flow sleeve and the transition piece, the interface assembly comprising:
an interface housing having a channel defined by a forward wall and at least one aft wall segment, the aft wall segment wall engageable with and operatively coupled to the aft flange of the flow sleeve; and
a piston ring fittingly disposed in the channel, wherein the at least one aft wall segment comprises a plurality of retaining tabs extending towards a centerline axis of the combustor in contact with the piston ring to retain the piston ring in the channel.

2. The combustor of claim 1, wherein the aft flange of the flow sleeve is substantially L-shaped.

3. The combustor of claim 1, wherein the aft wall segment of the interface housing is welded to the flow sleeve.

4. The combustor of claim 1, wherein the channel is substantially U-shaped.

5. The combustor of claim 1, further comprising a wear coating on at least one surface of the interface assembly, the at least one surface comprising a piston ring forward face, a piston ring aft face, a piston ring inner face, the inner face of a forward wall of the interface assembly and the aft face of the aft flange.

6. The combustor of claim 5, wherein the wear coating comprises a wear resistant coating.

7. The combustor of claim 6, wherein the wear resistant coating is a cobalt chromium alloy.

8. The combustor of claim 1, further comprising a resilient member disposed between an interface housing surface and an inner surface of the aft flange of the flow sleeve.

9. The combustor of claim 8, wherein the resilient member comprises a spring leaf seal.

10. The combustor of claim 9, wherein the resilient member is operatively coupled to the interface housing.

11. The combustor of claim 9, wherein the resilient member is integrally formed with the interface housing.

12. The combustor of claim 1, wherein the interface assembly is removable and replaceable with the flow sleeve.

13. A combustor arrangement comprising:
a combustor liner;
a flow sleeve disposed radially outwardly of the combustor liner, the flow sleeve comprising an aft flange;
a transition piece disposed adjacent to the aft flange of the flow sleeve; and
an interface assembly disposed axially between the flow sleeve and the transition piece, the interface assembly comprising:
a forward wall having an outer face and an inner face;
a plurality of circumferentially spaced aft wall segments connected to the forward wall with a base wall, the base wall, the forward wall and the plurality of circumferentially spaced aft wall segments integrally formed and defining a channel, the interface assembly engageable with and operatively coupled to the aft flange of the flow sleeve proximate an intersection of the plurality of circumferentially spaced aft wall segments and the base wall;
a piston ring fittingly disposed in the channel; and
a resilient member disposed between an outer surface of the base wall and an inner surface of the aft face of the flow sleeve, wherein the plurality of circumferentially spaced aft wall segments comprises a plurality of retaining tabs extending towards a centerline axis of the combustor in contact with the piston ring to retain the piston ring in the channel.

14. The combustor arrangement of claim 13, wherein the interface assembly is welded to the aft flange of the flow sleeve.

15. The combustor arrangement of claim 13, further comprising a wear coating disposed on the inner face of the forward wall.

16. The combustor arrangement of claim 13, further comprising a wear coating on at least one surface of the piston ring, the at least one surface comprising a piston ring forward face, a piston ring aft face, and piston ring inner face.

17. The combustor arrangement of claim 13, wherein the resilient member comprises a leaf spring seal.

18. A gas turbine engine comprising:
a compressor;
a turbine;
a combustor arrangement having a flow sleeve and a transition piece disposed proximate an aft flange of the flow sleeve; and
an interface assembly disposed axially between the flow sleeve and the transition piece, the flow sleeve comprising the aft flange; the interface assembly comprising:
an interface housing having a channel defined by a forward wall and a plurality of circumferentially spaced aft wall segments, the interface housing engageable with and operatively coupled to the aft flange of the flow sleeve; and
a piston ring fittingly disposed in the channel, wherein the plurality of circumferentially spaced aft wall segments comprises a plurality of retaining tabs extending towards a centerline axis of the combustor.

* * * * *